July 9, 1940.  J. S. WEIGHTMAN  2,207,139
MEASURING TAP
Filed Nov. 4, 1939
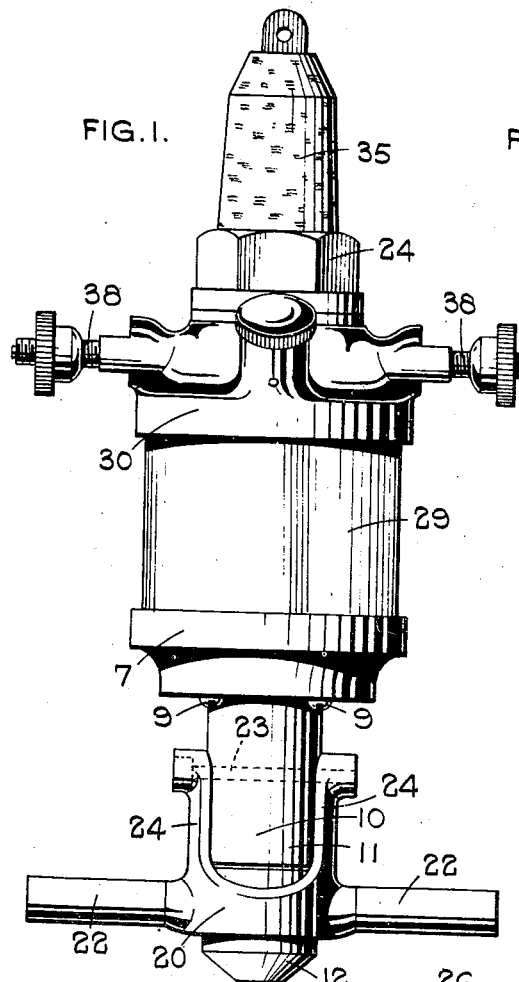
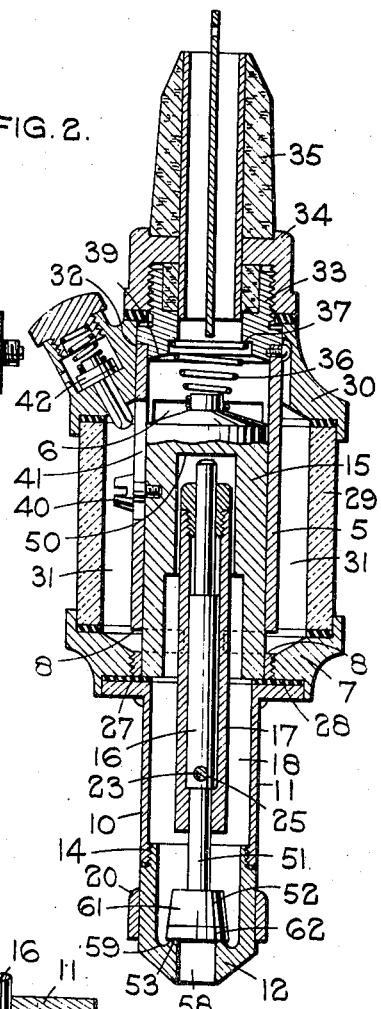
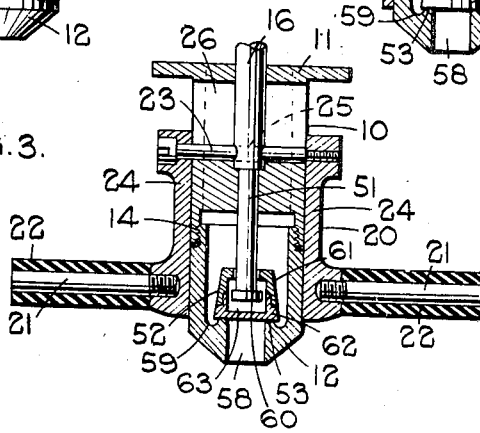
Inventor:
John Sinclair Weightman
Saulnier & Saulnier
Attorneys.

Patented July 9, 1940

2,207,139

UNITED STATES PATENT OFFICE 2,207,139

MEASURING TAP

John Sinclair Weightman, Dale End, Birmingham, England, assignor to Gaskell & Chambers, Limited, Birmingham, England Application November 4, 1939, Serial No. 302,921
In Great Britain December 22, 1938

9 Claims. (Cl. 221—112)

This invention relates to measuring taps, and refers more particularly to the kind of tap which is adapted to be connected to an inverted bottle or other vessel and has a measuring chamber through which extends a tubular valve casing with inlet and discharge ports spaced longitudinally thereof, said casing containing a slidable valve (hereinafter referred to as the "main valve") which can be operated by pushing it upwards with a drinking or other vessel and which has parts adapted to co-operate with valve seatings associated, respectively, with the inlet and discharge ports.

With taps of the above kind, it is usual to provide, at the lower end of the valve casing, a suitable nozzle through which a chamberful of liquid is dispensed when the valve is raised sufficiently to uncover the discharge ports.

The interior of this nozzle is, of course, wetted by the dispensed liquid, and however short the nozzle may be, there is always, in measuring taps as at present constructed, a certain amount of dripping after the discharge ports have been closed by the valve.

The chief object of the present invention is to provide an improved construction of tap whereby this dripping is substantially eliminated.

Referring to the drawing—

Figure 1 is a side elevation of one form of measuring tap embodying the present invention, Figure 2 is a sectional elevation of the tap as viewed from the right-hand side of Figure 1, and Figure 3 is a sectional side elevation of the delivery nozzle and the actuating means for the main valve.

In the construction of measuring tap illustrated, which forms the subject of my co-pending application, Serial No. 302,920, the valve casing 5 is of cylindrical shape and is provided near its upper end with a pair of inlet ports 6 in the form of diametrically-opposed circumferential slots.

The lower end of the valve casing 5 is screwed into, or otherwise fixedly united to, a flange 7, and the portion of the casing 5 immediately above this flange 7 is formed with a pair of discharge ports 8 which may also be of slot-like form.

Connected by screws 9 or otherwise to the underside of the flange 7, and in alignment with the valve casing 5, is a dependent nozzle 10 formed in two parts 11, 12 which may be screwed together, as at 14.

The main valve 15 of the tap is a close sliding fit within the cylindrical casing 5 and is actuated by a rod 16 which extends downwardly therefrom into the interior of the nozzle 10, this actuating member 16 having associated therewith a pair of laterally projecting arms 21 which may be provided with rubber sleeves 22.

The main valve 15 can be raised within its casing 5 by pressing the rim of a glass or other vessel upwardly against the lateral arms 21 associated with the valve-actuating member 16.

Normally the lower end of the main valve 15 makes liquid-tight contact with an annular seating 27, which is preferably faced with a washer 28 of cork or other relatively soft material, which surrounds the upper end or ends of the liquid passage or passages through the nozzle 10, and this seating 27 may be continued by a shoulder within the valve casing 5 itself or by the upper face of the nozzle 10 when the latter is formed separately from said casing.

The seating 27 is located below the level of the delivery ports 8 in the valve casing, and when the main valve 15 is in its normal position the upper end thereof may be substantially flush with the lower edges of the inlet ports 6.

The inlet and discharge ports 6, 8 are preferably arranged so that the rising valve 15 closes the inlet ports 6 before it commences to open the discharge ports 8, such an arrangement of the ports 6, 8 in relation to the normal or lowest position of the valve 15 forming the subject of British Patent No. 476,767.

A short length of glass tube 29 which surrounds the valve casing 5 is supported on the flange 7 at the lower end of the latter and is clamped between the flange 7 and a cover member 30 which is connected thereto in any suitable manner, the annular space 31 between the glass tube 29 and the casing 5 constituting the measuring chamber of the tap.

Preferably, the upper end of the valve casing 5 fits into a central opening 32 in the cover member 30 and has secured thereto a hollow neck 33 which projects externally of the cover member 30, the projecting portion of the neck 33 being screw-threaded for engagement with an annular cap 34 which may be formed or provided with a tapered spigot 35 adapted for engagement with the neck of an inverted bottle. Alternatively, the neck of the bottle may fit into a neck on the cover member 30 as described in the specification of the British patent aforesaid.

A coil spring 36 may be compressed between a shoulder 37 in the neck 33 and the top of the main valve 15.

The cover member 30 may be provided with trunnions 38 or other means whereby it may be attached, pivotally or otherwise, to a suitable support.

A suitable seating 39 for engagement by the upper end of the main valve 15, when the latter is fully raised, is provided at the top of the valve casing 5 above the level of the inlet ports 6, and this seating may be constituted by the lower edge of the hollow neck 33 to which the valve casing 5 is secured.

This upper valve seating 39 may be faced with a washer of cork or other relatively soft material similar to that associated with the lower seating 27.

When the main valve 15 is in its lowest position, liquid can enter the measuring chamber 31 through one of the inlet ports 6 whilst displaced air passes upwardly into the bottle through the other of such ports.

Once the chamber 31 is full, the main valve 15 may be raised in the manner already described, so that the inlet ports 6 are closed and the outlet ports 8 opened so that liquid can escape into the nozzle 10.

The main valve 15 may be provided with a lateral projection 40 which extends through a slot 41 in the valve casing 5, and this projection 40 may be arranged to open an air vent or snifting valve 42 in the cover member 30 just before the main valve 15 reaches the top of its stroke.

In accordance with the present invention, a subsidiary valve 52 carried by the actuating member 16 of the main valve 15 is provided in order positively to prevent dripping from the nozzle 10 after the main valve 15 has been allowed to return to its normal position.

The lower part 12 of the nozzle 10 may be contracted to form a mouth piece 58 which constitutes the delivery opening of the tap, and the anti-drip valve 52 may co-operate with a seating 53 arranged internally of the mouth piece 58.

The seating 53 may be constituted by the inner peripheral portion of a shoulder within the nozzle part 12, and an annular groove 59 may be formed in this shoulder around the seating portion 53 thereof, which latter may be flat.

Preferably the lateral arms 21 associated with the actuating member 16 of the main valve 15 are carried by a sleeve 20 which is slidable up and down the nozzle 10. A pin or bolt 23, which is arranged diametrically of the sleeve 20 and engages upwardly directed lugs 24 thereon, passes through a hole 25 in the valve-actuating rod 16, longitudinal movement of the rod 16 and sleeve 20 being provided for by a diametral slot 26 in the upper part 11 of the nozzle 10.

The upper part 11 of the nozzle 10 may be formed, as at 17, with a guide for the rod 16 and a longitudinal passage 18 may be formed therein at one or each side of the guide 17, this passage or passages 18, which has or have no communication with the slot 26, preferably being of half-moon or like section.

The lower end of the rod 16 may be rigidly connected to the anti-drip valve 52, so that the latter, which is preferably of somewhat conical form, is pressed against its seat 53 by the weight of the rod 16.

It is preferred, however, to allow the anti-drip valve 52 a certain amount of freedom longitudinally of the rod 16.

For example, it may be slidably mounted on the lower part 51 of the rod 16, and the latter may be provided with an integral or other head 60 which is accommodated in a recess in the underside of the valve 52. This recess may be closed by a screwed plug, the depth of the cavity thus formed within the valve 52 being greater than the depth of the head 60 on the rod 16. The lower end of the valve 52 may be faced up in any suitable manner.

Alternatively, as in the construction shown, the upper part 61 only of the valve 52 may be mounted on the rod 16, the lower part of the valve 52 being constituted by a separate member 62 which has a screw-threaded or other connection to the upper part 61, either or both of the parts 61, 62 being recessed to provide an internal cavity 63 in which the head on the rod has the requisite freedom.

The above arrangement ensures that slight variations in the relative positions of the valve seating 53 and the head 60, such as may occur in the course of manufacture, shall not affect the engagement of the anti-drip valve 52 with the seating 53 under the action of its own weight. Normally the rod 16 which actuates the main valve 15 will be spaced somewhat from both ends of the cavity 63 in the anti-drip valve 52 when the latter is seated.

Furthermore, accurate seating of the anti-drip valve 52 is assured even if the rod 16 is not absolutely perpendicular to the plane of the seating 53 in the nozzle 10.

The main valve 15 may be quite separate from its actuating member 16, which latter may act merely as a push-rod and a certain amount of clearance may be provided between the upper end of the actuating member 16 and the co-acting face 50 of the main valve 15 when both the latter and the actuating member 16 are in their lowest positions.

It will be understood that, in applying the present invention to a tap constructed as described in British specification No. 476,767, the anti-drip valve 52 may either be fixed to the valve-actuating rod 16 or free to move longitudinally thereof between suitable stops.

In all cases, the anti-drip valve 52 has the advantage that it seals within the tap the aroma of the liquid to be dispensed.

What I claim then is:

1. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a valve seating adjacent the delivery opening of the tap, an anti-drip valve co-operating with said seating and normally closing said delivery opening, and means whereby said anti-drip valve is automatically opened when said main valve is raised.

2. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, actuating means for said main valve, a valve seating adjacent the delivery opening of the tap, an anti-drip valve co-operating with said seating and normally closing said delivery opening, and means operatively connecting said anti-drip valve to said main valve so that raising of the latter opens said anti-drip valve.

3. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a push-rod adapted, when displaced upwardly by a receiving vessel, to actuate said main valve, a valve seating adjacent the delivery opening of the tap, an anti-drip valve co-operating with said seating and normally closing said delivery opening, and means operatively connecting said anti-drip valve to said main valve so that raising of the latter opens said anti-drip valve.

4. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a delivery nozzle below said valve casing, an anti-drip valve disposed in the lower part of said nozzle and normally closing the liquid passage therethrough, and means whereby said anti-drip valve is automatically opened when said main valve is raised.

5. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a nozzle below said valve casing having a delivery opening in the lower end thereof, a valve seating disposed around said delivery opening and itself surrounded by an annular groove, an anti-drip valve co-operating with said seating and normally closing said delivery opening, and means whereby said anti-drip valve is automatically opened when said main valve is raised.

6. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a push-rod adapted, when displaced upwardly by a receiving vessel, to actuate said main valve, a valve seating adjacent the delivery opening of the tap, and an anti-drip valve mounted on the lower end of said push-rod and normally engaging said seating so as to close said delivery opening.

7. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a push-rod adapted, when displaced upwardly by a receiving vessel, to actuate said main valve, a valve seating adjacent the delivery opening of the tap, and an anti-drip valve carried by the lower end of said push-rod and having freedom of movement longitudinally thereof, said anti-drip valve normally resting on said seating so as to close said delivery opening.

8. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a push-rod adapted, when displaced upwardly by a receiving vessel, to actuate said main valve, an enlarged head on said push-rod, a valve seating adjacent the delivery opening of the tap, and an anti-drip valve mounted on the lower end of said push-rod and normally engaging said seating so as to close said delivery opening, said anti-drip valve having formed within it a cavity of greater depth than, and serving to accommodate, said enlarged head.

9. A measuring tap adapted to be connected to an inverted container, comprising a measuring chamber, a tubular valve casing extending through said measuring chamber and provided with inlet and discharge ports spaced longitudinally thereof, a main valve slidable in said valve casing, said main valve normally closing said discharge ports and being adapted on upward movement to open said discharge ports and to close said inlet ports, a push-rod adapted, when displaced upwardly by a receiving vessel, to actuate said main valve, an enlarged head on said push-rod, a valve seating adjacent the delivery opening of the tap, and an anti-drip valve mounted on the lower end of said push-rod and normally engaging said seating so as to close said delivery opening, said anti-drip valve being formed in two parts enclosing a cavity adapted to accommodate, and of greater depth than, said enlarged head.

JOHN SINCLAIR WEIGHTMAN.